United States Patent [19]

Johnson

[11] Patent Number: 4,493,032

[45] Date of Patent: Jan. 8, 1985

[54] METHOD AND APPARATUS FOR POSITIONING USING CIRCULAR INTERPOLATION

[75] Inventor: Brian C. Johnson, Syracuse, N.Y.

[73] Assignee: General Electric Company, Charlottesville, Va.

[21] Appl. No.: 415,745

[22] Filed: Sep. 7, 1982

[51] Int. Cl.³ .............................................. G05B 19/25
[52] U.S. Cl. .................... 364/169; 364/702; 364/720; 364/474; 364/853; 318/573
[58] Field of Search ............... 364/169, 702, 720, 474, 364/475, 853; 318/573

[56] References Cited

U.S. PATENT DOCUMENTS 4,243,924 1/1981 Onoda et al. .................... 318/573 O
4,423,481 12/1983 Reid-Green et al. ............ 318/573 X

*Primary Examiner*—Jerry Smith
*Assistant Examiner*—Allen MacDonald
*Attorney, Agent, or Firm*—Ormand R. Austin

[57] ABSTRACT

A method and apparatus are disclosed for providing very precise incremental motion of a numerically controlled machine tool, or other similarly controlled object, along a circularly arced path. For a mutually perpendicular X and Y coordinate system, X and Y indices are determined based on certain prescribed input information related to the parameters of the circular path and the relative rate of motion between the machine tool and the workpiece, and on immediate, continuously recomputed, coordinates of the tool or object. The indices are each scaled by a modulus related to the radius of the arc to generate incremental distances $\Delta X$ and $\Delta Y$ according to which the next move is to be made. The process is reiterated until the desired circular path is complete. In both method and apparatus, only integer values of $\Delta X$ and $\Delta Y$ are used for implementing each increment of motion. Non-integer values are carried forward to the next iteration of the process to prevent error accumulation.

17 Claims, 2 Drawing Figures

METHOD AND APPARATUS FOR POSITIONING USING CIRCULAR INTERPOLATION

A microfiche appendix hereto, including 88 frames, sets forth a computer program listing including that which is applicable to the present invention.

Background of the Invention

This invention relates generally to methods and apparatus for moving an object along a desired or prescribed path and relates, more particularly, to such methods and apparatus for precisely moving a machine tool, or similar device, along a circularly curved path.

In numerically controlled machine tools, or in similar machines wherein it is desired to move an object along a prescribed path, it is usual to obtain motion by small increments in order to closely approximate the desired curve. This is carried out by making a decision at the initial point of the curve and at each succeeding point thereon as to whether to increment along the X axis, the Y axis or both the X and Y axes simultaneously. For linear interpolations the information initially available consists of the coordinates of the starting and end points. From this information, control of movement along the axes is such that the coordinates change in a linear fashion up to the desired end point with the desired degree of accuracy. For circular interpolation the initial information available also includes the arc center offset and the direction of motion. Generally, for both types of interpolation, digital signals are provided to servo mechanisms to effect the axial movements. Each digital signal thus corresponds to some number of units of incremental motion parallel to the appropriate axis.

There are a number of known methods according to which interpolation units produce output signals to generate the desired functions. These include the digital differential analyzer (DDA) method, the MIT method, the Saita function generator, and the method of algebraic solution. Further, in a copending application, Ser. No. 322,356, assigned to the assignee of the instant invention, a method and system are disclosed in which a deviation index is generated as an invariant function of a parameter from the curve to be generated. By at all times moving such that the index is minimized, the desired curve or path is followed.

Although these previously known methods have provided generally satisfactory results, other methods particularly suitable for circular interpolation and for implementation in microcomputerbased numerically controlled machines have been sought by those skilled in the art.

It is, therefore, generally the object of the present invention to provide an improved method and apparatus by which circular interpolation may be carried out to accurately move a numerically controlled machine tool, or similar device, along a desired circular arc.

SUMMARY OF THE INVENTION

Accordingly, the present invention provides a method and apparatus to obtain very accurate incremental movement of a machine tool, or other controlled object, along a circularly arced path. The preferred method is to determine X and Y indices based on prescribed input information related to the parameters of the circular path and the relative rate of motion and, additionally, on the immediate, continuously determined, coordinates of the tool or object. The indices are subsequently scaled by a modulus related to the radius of the arc to generate incremental distances $\Delta X$ and $\Delta Y$ according to which the next move is to be made. The process is reiterated until the desired circular path is complete. Most preferably the process is carried out in conjunction with a microprocessor having a stored program of instructions to implement the process at a relatively high iteration rate.

Apparatus embodying the invention includes means providing data related to the starting coordinates, the arc angle per incremental move, and the modulus; means for repeatedly updating the immediate coordinate position of the controlled object; a combination of multiplying and adding circuitry for repeatedly determining X and Y indices; and scaling means for scaling each index by factor related to the modulus. Generally, the scaling circuits comprise circuits configured either as multipliers or dividers, depending on the form in which the modulus is supplied.

In both method and apparatus, only integer values of $\Delta X$ and $\Delta Y$ are used for implementing the motion on each iteration of the process. Thus, non-integral moves are not carried out. Preferably, non-integral portions are carried forward to the next iteration to prevent error accumulation.

BRIEF DESCRIPTION OF THE DRAWING

While the specification concludes with claims particularly pointing out and distinctly claiming the subject matter regarded as the invention, the invention will be better understood from the following description taken in conjunction with the accompanying drawings in which:

DETAILED DESCRIPTION OF THE INVENTION

Figure 1:
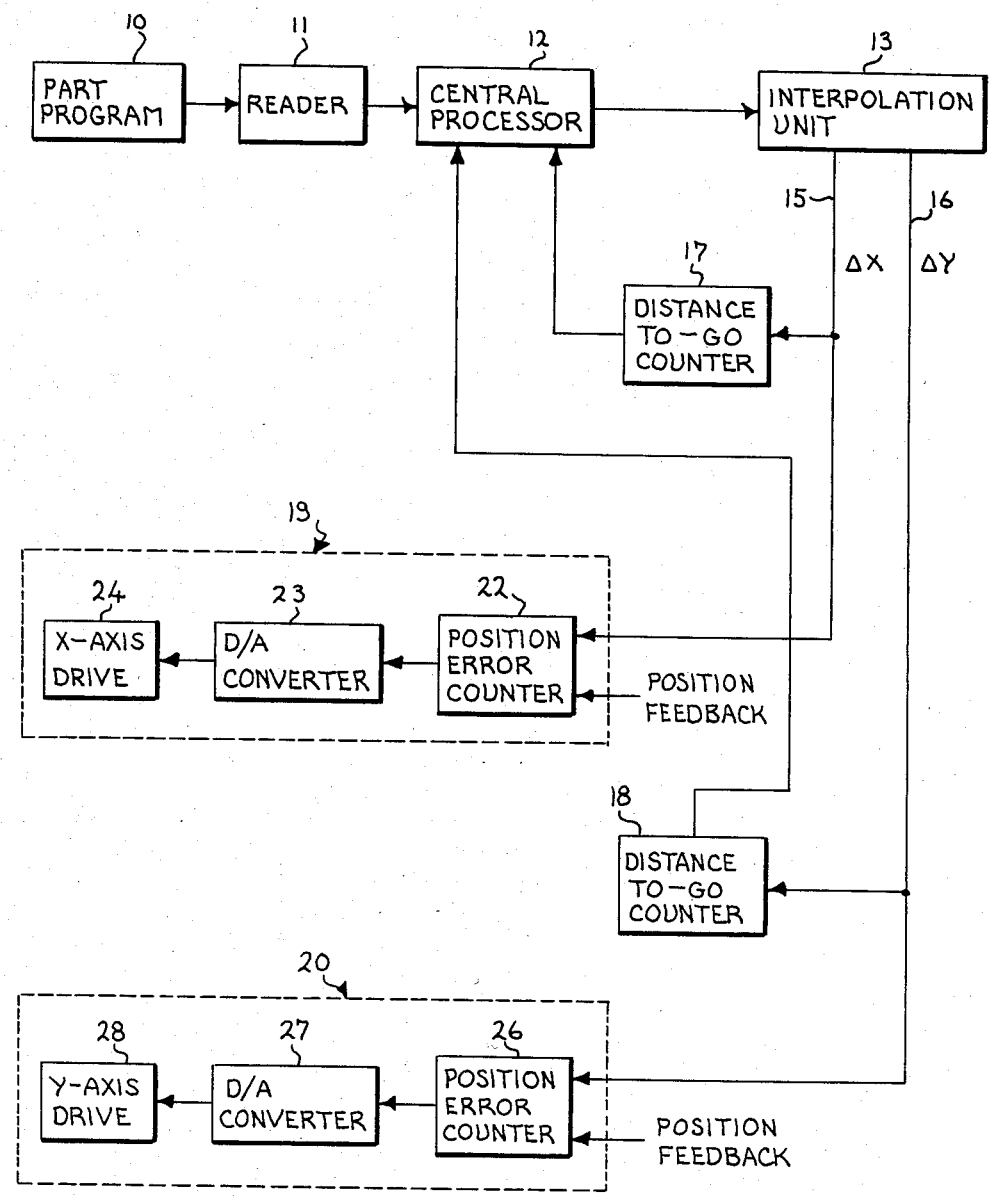
FIG. 1 is a simplified block diagram of relevant portions of a machine tool numerical control system incorporating the present invention; and, FIG. 2 is a simplified block diagram of one form of circular interpolation apparatus according to the invention.

FIG. 1 illustrates in simplified form the relevant portions of a control system for a numerically controlled machine tool. A punched paper tape, or an equivalent program storage medium, provides a part program 10 which includes a set of coded command instructions on the major moves to be made by the controlled tool in order to machine a part having the desired shape. A reader 11 converts the coded instructions into electrical signals which are fed to a central processor 12 wherein major moves may be broken up into smaller moves. The central processor 12, while providing other control functions, activates and controls an interpolation unit 13 which generates output signals (appearing at output lines 15 and 16), which are repesentative of incremental distances $\Delta X$ and $\Delta Y$, for incrementing motion of the controlled tool (not illustrated) along the directions of mutually perpendicular axes, referred to herein as the X and Y axes, respectively, as is conventional. Each $\Delta X$ and $\Delta Y$ distance represents an incremental distance over which the tool is to be moved in the direction of the appropriate axis. The $\Delta X$ and $\Delta Y$ signals are passed to distance-to-go counters 17 and 18, and to servo mechanisms 19 and 20, respectively. At the start of each major move, the distance-to-go counters 17 and 18 are initialized by the central processor 12. Completion of a major move is indicated by these counters having been decremented to zero. At that time the central processor 12 may then pass data related to the next major move to the interpolation unit 13 and the distance-to-go counters 17 and 18.

The X direction move signals are passed to an X-direction servo mechanism 19 which is comprised of a position error counter 22, a digital-to-analog converter 23, and axis drive unit 24. The X interpolation signals from interpolation unit 13 are fed to one input of error counter 22 while a feedback signal, indicative of the X position of the tool (the feedback signal is generated in a well-known manner) is presented to the other input. Thus, the position error counter 22, in combination with digital-to-analog converter 23 and X-axis drive unit 24 provides a null detector so that the machine tool is precisely driven in the X direction to the correct point. Drive mechanism 24 may, for example, be a dc motor. The Y interpolation output signals from the interpolation unit 13 and a feedback signal related to the actual Y position of the tool are fed to a Y-direction servo mechanism 20 configured in the manner of the X direction servo mechanism 19 to include a second error position counter 26, a digital-to-analog converter 27, and a Y-axis drive unit 28. The drive unit 28 effects movement in the Y direction.

When a curve described by a two dimensional function, such as a straight line or a circular arc is to be followed, the interpolation unit 13 provides signals indicative of small increments $\Delta X$ and $\Delta Y$ so that the relative movements determine the shape of the path followed by the controlled tool. The path is followed in discrete increments, in step-by-step fashion until the prescribed path is completed. For each step, a decision must be made regarding the next step as to how much of the incremental motion must take place in the X direction and how much in the Y direction. It is a feature of the present invention to provide a method and system for directing the machine tool so that it very accurately follows a circularly arced path. Preferably, the method is carried out in conjunction with a microcomputer having a stored program of instructions so that iterations of the method are frequent, making the incremental movements very small to achieve a high degree of conformity to the desired path.

For an X-Y rectangular coordinate system, and for circular interpolation, it has been found advantageous to move the machine tool, for example, such that the next incremental step in the X coordinate direction is by an amount proportional to: (1) the tool's immediate distance in the X direction from the arc center scaled by a factor proportional to the cosine of the angle of movement carried out for each incremental move; (2) decreased by the tool's immediate distance in the X direction from the arc center; and (3) decreased by the tool's immediate distance in the Y direction from the arc center, scaled by a factor proportional to the sine of the angle of movement carried out for each incremental move.

For the increment in the Y direction (which may be carried out simultaneously with the incremental move in the X direction), a similar move is carried out. Thus, the Y direction move is proportional to: (1) the tool's immediate distance in the Y direction from the arc center scaled by a factor proportional to the cosine of the angle of movement carried out for each incremental move; (2) decreased by the tool's immediate distance in the Y direction from the arc center; and (3) increased by the tool's immediate distance in the X direction from the arc center, scaled by a factor proportional to the sine of the angle of movement carried out for each incremental move.

These moves are repetitively carried out until the desired path is complete.

It has been found convenient to summarize the incremental amount of each move by the following relationships:

$$\Delta X = X_i \cos \frac{d}{R} - X_i - Y_i \sin \frac{d}{R} \tag{1}$$

$$\Delta Y = Y_i \cos \frac{d}{R} - Y_i + X_i \sin \frac{d}{R} \tag{2}$$

where:
d = arc distance per increment
R = radius of the circular arc
$X_i$ = immediate (or present) distance of the tool, or device, in the X direction from the arc center
$Y_i$ = immediate (or present) distance of the tool, or device, in the Y direction from the arc center.

It will be recognized that the ratio d/R defines the change in angle $\Delta\theta$ of the arc for each incremental move. Further, in defining $X_i$ and $Y_i$ it will be recognized that the actual location of the positioned device at any time may lag slightly its desired, or commanded, position $(X_i, Y_i)$ due to inherent time delays.

Relating equations (1) and (2) to the apparatus of FIG. 1, $\Delta X$ and $\Delta Y$ (representing distances to be moved in the X and Y directions, respectively) are each characterized by the signals appearing, respectively, at lines 15 and 17 of FIG. 1, for each iteration of the method outlined above. The steps of the method are repetitively carried out in the interpolation unit 13 as directed by the central processor 12 and with certain elements necessary to implement the method being supplied thereby. Thus, for example, the radius R of the arc and the arc length d are supplied by the central microcomputer 12 generally as a function of the parameters and geometry of the part being machined by the tool.

In addition, it will be recognized that d, the arc length, can be represented by digital signals as are $\Delta X$ and $\Delta Y$. In the field of numerical control, d is commonly given as NFP, or the "number of feed pulses", since this terminology relates to units of distance. Thus, it may at times be convenient herein to state d in terms of NFP.

Moves of $\Delta X$ and $\Delta Y$ carried out as outlined above are difficult to implement with the high degree of accuracy required in a numerical control system. It has been discovered instead that a more compatible method is to generate interim indices which are indicative of the incremental $\Delta X$ and $\Delta Y$ moves and to then use these indices for determining the actual $\Delta X$ and $\Delta Y$ moves to be carried out.

The indices may be readily generated in terms of the number of feed pulses (NFP, which is equivalent to d as defined above) and in terms of the change in angle of the arc for each increment, d/R, which may conveniently be rewritten simply as $\Delta\theta$. The indices may be summarized as follows:

$$X \text{ Index} = NFP \left[ \frac{X_i(\cos \Delta\theta - 1)}{\Delta\theta} - \frac{Y_i(\sin \Delta\theta)}{\Delta\theta} \right] \tag{3}$$

$$Y \text{ Index} = NFP \left[ \frac{Y_i(\cos \Delta\theta - 1)}{\Delta\theta} + \frac{X_i(\sin \Delta\theta)}{\Delta\theta} \right] \quad (4)$$

Each index relates to the correspondingly appropriate value, $\Delta X$ or $\Delta Y$.

For each incremental move, new X and Y indices are determined. Scaling each index by a factor inversely proportional to R returns the $\Delta X$ and $\Delta Y$ values. As the $\Delta X$ and $\Delta Y$ moves are implemented, only integral values are taken to effect a move, i.e., non-integral increments resulting from the scaling operation are not taken. The non-integral portions from one iteration of the process are preferably held and carried forward to the next and used in determining the next incremental move. This has the advantage of avoiding cumulative effects and greatly improves the accuracy attained. Techniques and apparatus for handling non-integer portions of the incremental moves $\Delta X$ and $\Delta Y$ are more fully set forth herein below in connection with FIG. 2.

Those of skill in the numerical control art will recognize that the inverse scale factor discussed above is equivalent to the inverse of what is commonly referred to as the "modulus". The modulus ordinarily includes a factor determinative of the relative rate of motion between the tool and the workpiece. In the method outlined above, this factor, conventionally termed the "feedrate scale", is taken as unity to simplify the description of the invention. Thus, in the general equations set forth above, the modulus is simply taken as equal to the radius of the circular arc.

Figure 2:
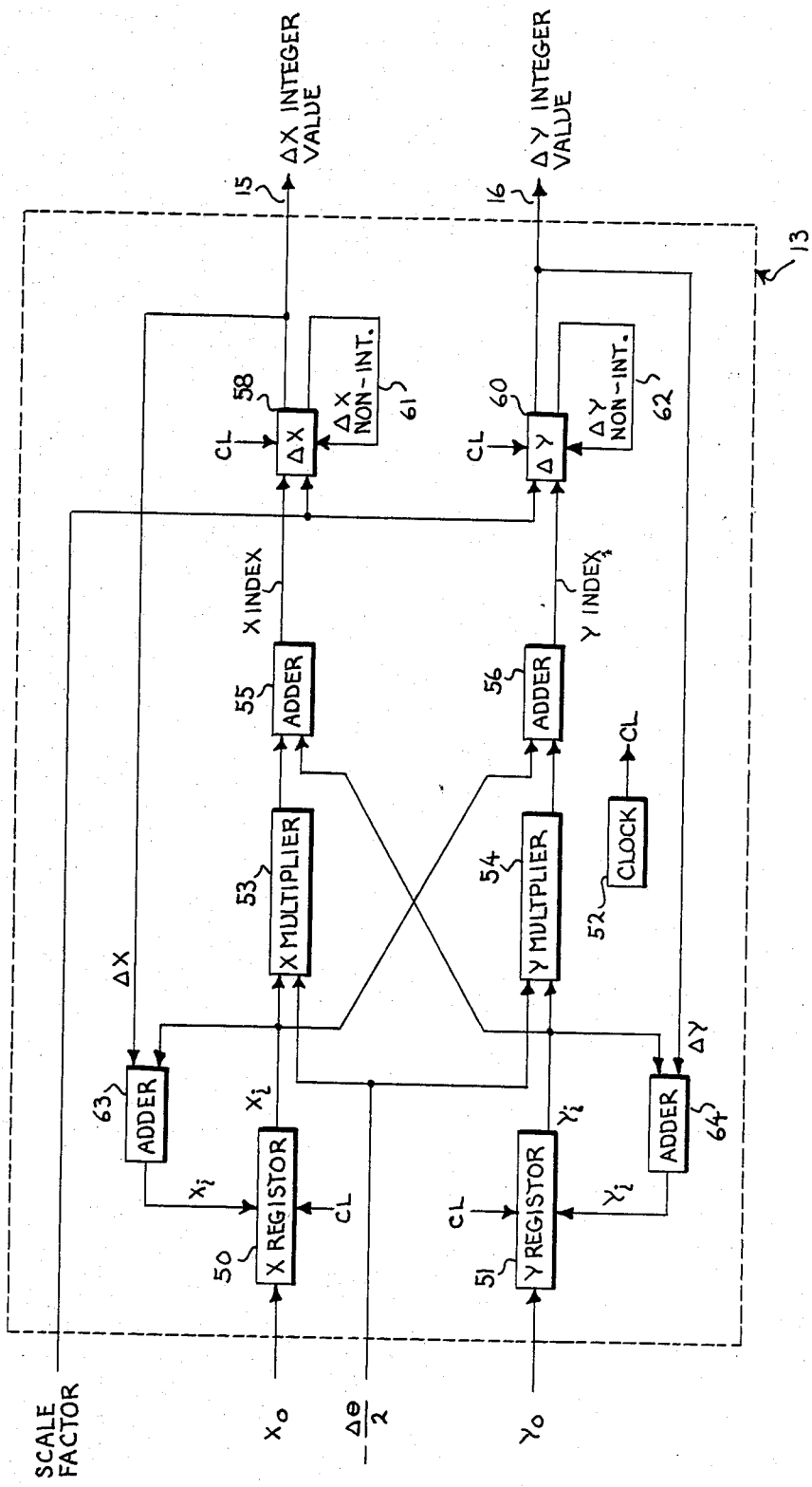

FIG. 2 illustrates the invention in one form of apparatus for implementing the interpolation unit 13 of FIG. 1 wherein interim X and Y indices are used for determining the $\Delta X$ and $\Delta Y$ moves. Thus, output lines 15 and 17 convey at least the integer portion of positioning signals for $\Delta X$ and $\Delta Y$ from the interpolation unit 13 to the appropriate servo mechanism. Data regarding $\Delta\theta$, a scale factor, and the initial X and Y distances from the arc center $X_0$ and $Y_0$, respectively are provided as inputs from the central processor 12 of FIG. 1. The value of $$\frac{-\Delta\theta}{2}$$

is an approximate representation of $$\frac{\cos \Delta\theta - 1}{\Delta\theta}$$

which has been found to be satisfactory for determining the X and Y indices for very small angles. This facilitates a determination of trigometric values by the central processor 12, for example. The approximation is based on a well known series expansion and conveniently allows the necessary functions to be calculated. For the embodiment of FIG. 2, the X and Y indices may be restated as follows:

$$X \text{ Index} = NFP \; X_i(-\Delta\theta/2) - Y_i \quad (5)$$

$$Y \text{ Index} = NFP \; Y_i(-\Delta\theta/2) + X_i \quad (6)$$

The scale factor, also supplied by the central processor 12 of FIG. 1, is equal either to the modulus or the inverse of the modulus, depending on how the $\Delta X$ and $\Delta Y$ values are recovered from the respective indices. This aspect of the embodiment of FIG. 2 will be more fully described herein below.

In FIG. 2, X and Y registers 50 and 51 are initialized by the introduction of starting coordinate values $X_0$ and $Y_0$, respectively. These registers 50 and 51 are clocked as is conventional so that their output values, representing repeatedly updated values $X_i$ and $Y_i$, are appropriately timed. Clock inputs are provided for timing and signal synchronization at CL input lines from clock 52.

The $X_i$ value from X register 50 is transferred to a multiplier 53 wherein the product of $X_i$ and $$-\frac{\Delta\theta}{2}$$

is produced; the $Y_i$ value from Y register 51 is transferred to a multiplier 54 wherein the product of $Y_i$ and $$-\frac{\Delta\theta}{2}$$

is produced. The value $$-\frac{\Delta\theta}{2}$$

is, in each case, supplied and updated as necessary by the central processor. The output of X multiplier 53 is connected to an adder 55 and the output of Y multiplier 54 is connected to an adder 56. The $X_i$ and $Y_i$ values are cross-connected to provide second inputs to each adder 56 and 55, correspondingly. That is, the $X_i$ output signal from X-register 50 is cross coupled to adder 56 and the $Y_i$ output signal from Y-register 51 is cross coupled to adder 55. A subtraction of the $Y_i$ value in adder 55 is actually carried out to accord the proper signal to $Y_i$. The output of the X-adder 55 is a signal indicative of the X index; the output of the Y-adder 56 is a signal indicative of the Y index.

The actual $\Delta X$ and $\Delta Y$ move signals are obtained by operation of scale factor networks 58 and 60, respectively. The exact configuration of these networks 58 and 60 depends upon the form in which the scale factor is presented. If the scale factor is presented as directly proportional to the modulus, the networks 58 and 60 are in the form of dividers to effect division of the indices by the modulus. On the other hand, if the scale factor is presented as inversely proportional to the modulus, the scale factor networks 58 and 60 are configured as multipliers to carry out multiplication of the scale factor and the respective index. It will be recognized, of course, that for any one embodiment of the invention the exact configuration of the scale factor networks 58 and 60 will be fixed.

Only the integer values of the $\Delta X$ and $\Delta Y$ outputs are taken from networks 58 and 60, respectively, to effect moves of the controlled machine tool. The non-integer portion of these signals are returned for the next iteration in determining new $\Delta X$ and $\Delta Y$ values, and in this way, as was mentioned above, the accuracy in attaining the prescribed path is enhanced since the non-integer portions are ultimately accounted for.

The configuration of the scale factor networks 58 and 60 dictates exactly how the non-integer portions of the signals are handled. If networks 58 and 60 are multipliers, the non-integer portions are treated as fractions;

multiplication of the appropriate index by the scale factor is first carried out and the returned fractional portion (generated in determining the immediately preceding incremental move) is then added in. By contrast, if the scale factor networks 58 and 60 are in the form of dividers, the non-integer portions are treated as remainders; the returned remainder value is first added to the appropriate index, followed by the division operation. In both cases registers are provided with appropriate clocking for signal transfer and timing. The integer portion of $\Delta X$ and $\Delta Y$ emerge at lines 15 and 17, while the non-integer portions are returned via lines 61 and 62, respectively. These are conventional signal handling techniques within the skill of the art and detailed means for carrying these operations out are not specifically illustrated.

The $\Delta X$ and $\Delta Y$ values are also returned, respectively, to adders 62 and 63 for computation of an updated value of the current X and Y coordinates for determining the next incremental move. That is, the new coordinate locations and the X and Y registers 50 and 51, respectively are periodically updated based on the incremental changes $\Delta X$ and $\Delta Y$ and immediately previous coordinate values of $X_i$ and $Y_i$.

It will be recognized that FIG. 2 is simplified in order to illustrate and describe the principles and operations of the invention. The apparatus of FIG. 2 may, of course, be carried out with analog, digital or a combination of analog-digital computing means. Most preferably, the apparatus is implemented with a microprocessor having a stored program of instructions. Thus, while there has been shown and described what is considered a preferred embodiment of the invention, it is understood that various other modifications can be made therein. It is intended to claim all such modifications which fall within the true spirit and scope of the present invention.

The invention claimed is:

1. A method for use in a numerical control system wherein move control signals, representative of distances to be moved, are iteratively distributed to mutually perpendicular X and Y coordinate axes causing incremental movement of a machine tool along a circularly arced path, comprising the steps of:
   (a) providing input information to an interpolation unit, said information defining a modulus M proportional to the radius R of the arced path and the arc length d per incremental move;
   (b) determining an X direction index according to the relationship $$X \text{ Index} = d\, X_i \frac{(\cos \Delta\theta - 1)}{\Delta\theta} - Y_i \frac{\sin \Delta\theta}{\Delta\theta}$$

wherein $X_i$ and $Y_i$ represent the immediate coordinate distances of the tool from the arc center and $\Delta\theta$ is equal to d/R;
   (c) determining a Y direction index according to the relationship:

$$Y \text{ Index} = d\, Y_i \frac{(\cos \Delta\theta - 1)}{\Delta\theta} - X_i \frac{\sin \Delta\theta}{\Delta\theta}$$

wherein $X_i$, $Y_i$ and $\Delta\theta$ are as defined in steps (b);
   (d) determining a distance $\Delta X$ to move the tool in the X direction by scaling the X index by an amount inversely proportional to the modulus;
   (e) determining a distance $\Delta Y$ to move the tool in the Y direction by scaling the Y index by an amount inversely proportional to the modulus;
   (f) distributing a move control signal to the X axis and a move control signal to the Y axis, each signal causing movement of the tool the corresponding distance $\Delta X$ and $\Delta Y$, respectively; and
   (g) reiterating steps (a) through (f) continuously until the machine tool has moved a desired distance along the circular path.

2. The method of claim 1 wherein for distances $\Delta X$ and $\Delta Y$ determined in steps (d) and (e), only integer portions of $\Delta X$ and $\Delta Y$ are taken to effect a move and non-integer portions are carried forward for the next iteration and used in determining new values of $\Delta X$ and $\Delta Y$.

3. The method of claim 2 wherein the X-index and the Y-index are each scaled by a factor inversely proportional to the modulus and the non-integer portion of a resulting value is treated as a fraction in determining the next incremental move.

4. The method of claim 2 wherein the X-index and the Y-index are each scaled by dividing by the modulus and the non-integer portion of a resulting value is treated as a remainder in determining the next incremental move.

5. The method of claims 1, 2, 3, or 4 wherein small angle approximations are used for $\Delta\theta$, and the X-index is determined according to the relationship $$X\text{-Index} = d\left[ X_i\left(-\frac{\Delta\theta}{2}\right) - Y_i \right]$$

and the Y-index is determined according to the relationship $$Y\text{-Index} = d\left[ Y_i\left(-\frac{\Delta\theta}{2}\right) - X_i \right].$$

6. The method of claim 5 wherein d is equal to a number of feed pulses.

7. The method of claim 1 wherein steps (c) and (b) are carried out substantially simultaneously.

8. In a numerical control system for a machine tool, apparatus for generating and distributing move control signals to mutually perpendicular X and Y axis drive mechanisms to effect incremental motion of the tool along a circular arced path, comprising:
   means for providing input signals representative of the initial X and Y coordinates of said path, the change in arc angle $\Delta\theta$ per incremental move, and a scale factor indicative of a modulus proportional to the radius R of the circular arc;
   means for determining, at any instant of time, a present X-coordinate distance of the tool from the arc center to produce an $X_i$ signal indicative of such distance;
   means for determining, at any instant of time, a present Y-coordinate distance of the tool from the arc center to produce a $Y_i$ signal indicative of such distance;
   first means receiving said $X_i$ signal and said $\Delta\theta$ signal to produce a first product signal indicative of the product of $X_i$ and a cosine function of $\Delta\theta$;
   second means receiving said $Y_i$ signal and said $\Delta\theta$ signal to produce a second product signal indicative of the product of $Y_i$ and a cosine function of $\Delta\theta$;

first adder means receiving said first product signal and said $Y_i$ signal for summing such signals to produce an X-index signal;

second adder means receiving said second product signal and said $X_i$ signal for summing such signals to produce a Y-index signal;

an X-scaling means receiving said X-index signal and said scale factor for scaling said X-index by said scale factor to produce a move control signal causing an incremental movement of the tool by a distance $\Delta X$ in the X direction; and a Y-scaling means receiving said Y-index signal and said scale factor for scaling said Y-index by said scale factor to produce a move control signal causing an incremental movement of the tool by a distance $\Delta Y$ in the Y direction.

9. The apparatus of claim 8 wherein said $\Delta X$ and $\Delta Y$ move control signals each represent an integral value of distance and said X and Y scaling means each includes means for holding non-integral portions of a move control signal for use in determining the next incremental move.

10. The apparatus of claim 9 wherein said scale factor is inversely proportional to the modulus and said X and Y scaling means are multipliers with the non-integral portions of said move control signals in the form of fractions.

11. The apparatus of claim 9 wherein said scale factor is directly proportional to the modulus and said X and Y scaling means are dividers with the non-integral portions of said move control signals in the form of remainders.

12. The apparatus of claims 9, 10, or 11 wherein:

said means for determining the present X coordinate distance of the tool from the arc center comprises a register for holding said $X_i$ signal for each incremental move and an adder for receiving the $\Delta X$ signal and the $X_i$ signal to provide an updated $X_i$ for each incremental move; and said means for determining the present Y coordinate distance of the tool from the arc center comprises a register for holding said $Y_i$ signal for each incremental move and an adder for receiving the $\Delta Y$ signal and the $X_i$ signal to provide an updated $Y_i$ for each incremental move.

13. The apparatus of claim 12 wherein said cosine function of $\Delta\theta$ is taken as $$-\frac{\Delta\theta}{2}.$$

14. A method for use in a numerical control system wherein move control signals, each representative of a fixed distance, are iteratively distributed to mutually perpendicular X and Y coordinate axes for incrementally moving a machine tool along a circularly arced path, comprising the steps of:

(a) providing input information to an interpolation unit, said information defining the radius R of the circularly arced path, the arc length d per iteration, and the immediate coordinate distances $X_i$ and $Y_i$ of the tool from the arc center;

(b) determining a distance $\Delta X$ to move the tool in the X direction according to the relationship:

$$\Delta X = X_i\left(\text{Cosine}\frac{d}{R} - 1\right) - Y_i \text{Sine}\frac{d}{R}$$

(c) determining a distance $\Delta Y$ to move the tool in the Y direction according to the relationship:

$$\Delta Y = Y_i\left(\text{Cosine}\frac{d}{R} - 1\right) + X_i \text{Sine}\frac{d}{R}$$

(d) distributing move control signals to the X and Y axes, said signals being indicative of the distances $\Delta X$ and $\Delta Y$ to be moved, and causing the tool to be moved the corresponding distance $\Delta X$ and $\Delta Y$, respectively; and, (e) continuously repeating steps (a) through (d) until the machine tool has moved a desired distance along said circular path.

15. The method of claim 14 wherein steps (b) and (c) are carried out substantially simultaneously.

16. The method of claim 15 wherein the arc length per iteration d is provided in terms of a number of feed pulses.

17. A method for incrementally positioning a device along a circularly arced path from a starting point to an ending point in a plane defined by mutually perpendicular X and Y axes, comprising the steps of:

(a) moving said device in the X direction by an increment proportional to its immediate X coordinate distance from the arc center scaled by a factor proportional to $$\text{Cosine}\frac{(d)}{R}$$

and decreased by its immediate X coordinate distance from the arc center and its immediate Y coordinate distance from the arc center scaled by a factor proportional to Sine d/R, wherein d is the arc length per incremental movement of said device and R is the arc radius;

(b) moving said device in the Y direction by an increment proportional to its immediate Y coordinate distance from the arc center scaled by a factor proportional to $$\text{Cosine}\frac{(d)}{R}$$

and decreased by its immediate Y coordinate distance from the arc center and increased by its immediate X coordinate distance from the arc center scaled by a factor proportional to $$\text{Sine}\frac{d}{R}$$

wherein d and R are as defined in step (a); and, (c) repeating steps (a) and (b) until said device reaches the end of said arced path.

* * * * *